Dec. 24, 1935.   H. A. NICHOLS   2,025,606
STILYARD OR BALANCE BEAM
Filed Oct. 15, 1934   2 Sheets-Sheet 1
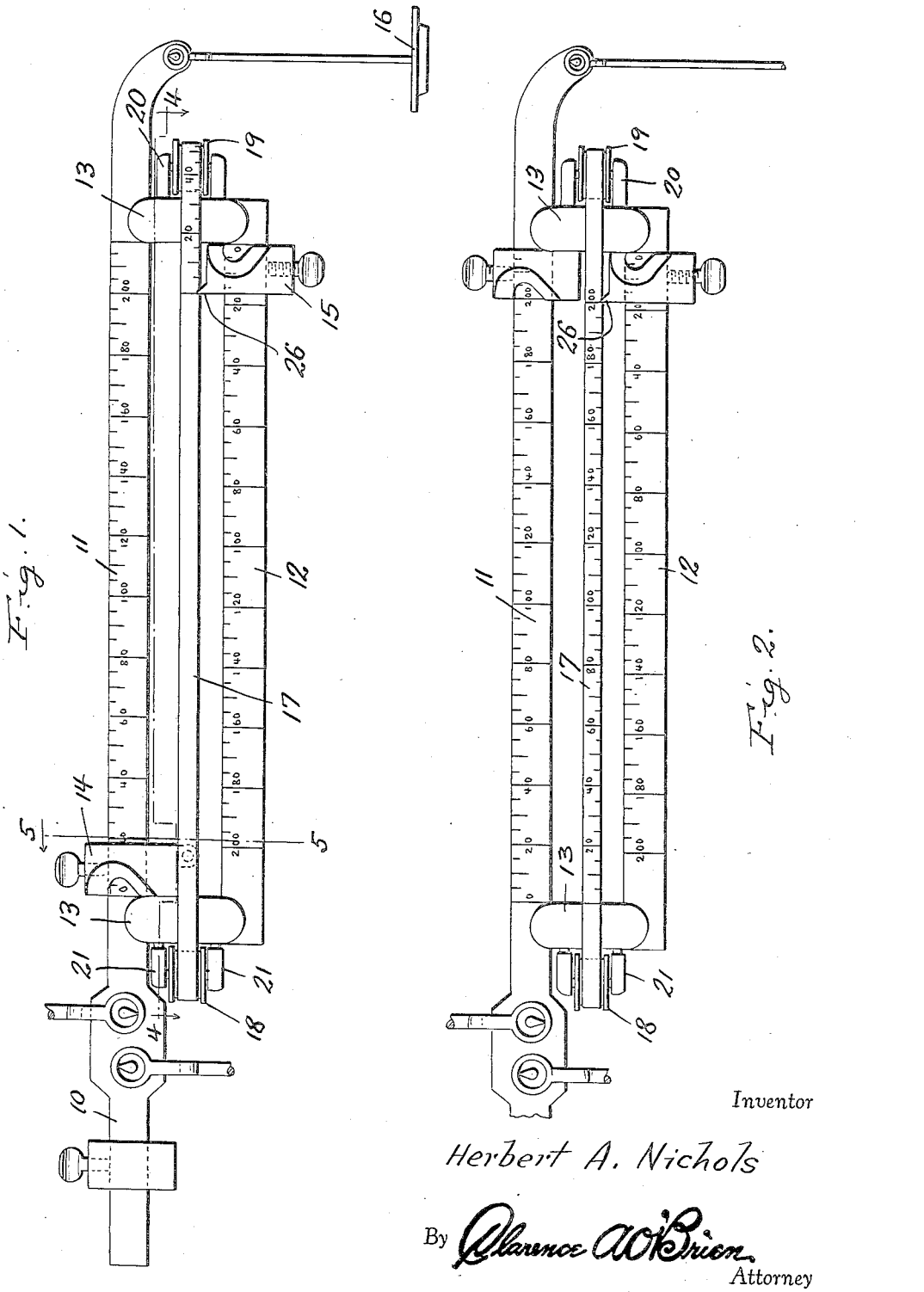
Inventor
Herbert A. Nichols
By Clarence A. O'Brien
Attorney

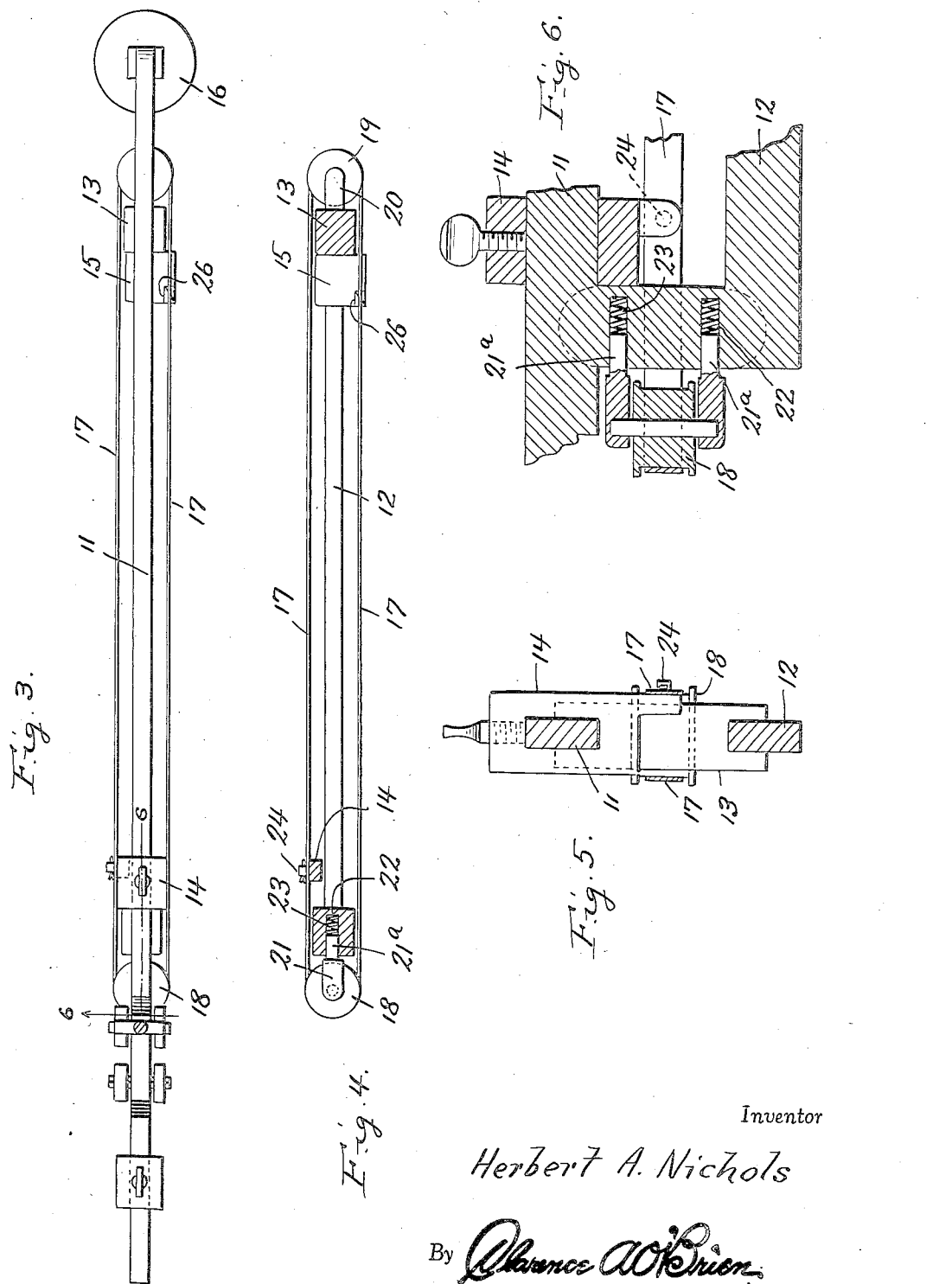

Patented Dec. 24, 1935

2,025,606

UNITED STATES PATENT OFFICE 2,025,606

STILYARD OR BALANCE BEAM

Herbert A. Nichols, Robstown, Tex.

Application October 15, 1934, Serial No. 748,465

4 Claims. (Cl. 265—49)

This invention relates to improvements in stilyards or balance beams of the type used on small platform or wagon scales used when the gross weight or load is weighed and net. contents are removed and their weight required to be ascertained.

An object of the present invention is to provide such a beam having as a unitary part thereof, a gross beam, a net beam, and a tare-tape whereby the net weight, the gross weight and the tare weight may be readily ascertained without requiring arduous mental calculation on the part of the operator of the scale.

The invention together with its objects and advantages will be best understood from a study of the following description taken in connection with the accompanying drawings wherein:

Figure 1 is a side elevational view of the beam showing the position of the parts when it is desired to obtain the gross weight of the load on the scale.

Figure 2 is a view similar to Figure 1 showing the location of the parts in determining the net weight of the load as well as the tare weight.

Figure 3 is a top plan view with certain parts shown in section.

Figure 4 is a detail view taken substantially on the line 4—4 of Figure 1.

Figure 5 is a vertical sectional view taken substantially on the line 5—5 of Figure 1, and Figure 6 is a detail view taken substantially on the line 6—6 of Figure 3.

Referring to the drawings by reference numerals it will be seen that 10 indicates generally the balance or stilyard beam, the same having as an integral part thereof a graduated or gross beam section 11. A graduated net beam section 12 is disposed below the gross beam 11 and is secured to the balance beam 10 through the medium of blocks 13, the latter at their upper ends being integral with the balance beam 10 and their lower ends being integral with the net beam 12. For the beams 11 and 12 are provided the usual balance weights 14 and 15 respectively while suspended from the beam 10 at the free end thereof in the usual manner is the weight 16 with which other weights may be associated in obtaining the gross weight of the load.

An endless, and suitably graduated tare-tape 17 of flexible metal or other suitable material is trained over a pair of rollers 18 and 19. One of the rollers, for example the roller 19 is journaled between a pair of vertically spaced arms 20 secured to the right hand block 13 in any suitable manner preferably by being integral therewith.

The other of the rollers or spools 18, is journaled between a pair of vertically spaced arms 21, that as clearly shown in Figure 6 are provided with reduced ends or portions 21a slidable in sockets 22 in the left hand block 13 and normally urged outwardly with reference to the sockets through the medium of springs 23 for maintaining at all times the tare tape 17 under tension and to automatically take up any slack that might develop in the tape. At a suitable point thereof the tape 17 is secured to the weight 14 as at 24. It will thus be seen that as the weight 14 is shifted along the gross beam 11 the tare-tape 17 will be forced to travel lengthwise so that the scale or graduations on the tare tape 17 may be read against an integral index 25 provided on the weight 15. In this connection it will also be noted that the blocks 13 serve as stops for the weight 14.

It will be seen, and as shown in Figure 1 that the scale is balanced with the weight 14 at the extreme left of the gross beam 11 and the weight 15 at the extreme right of the net beam 12. In this connection it will be also noted that with the stilyard beam so balanced the index or pointer on the weight 14 will be opposite the zero graduation of the scale on the tare-tape 17.

It will be further noted that the scale numbers on the beam 11 increase from the left to the right while the scale numbers on the beam 12 increase in an opposite direction or from right to left.

When the gross weight of a load is to be determined, the beam 11 and its associated weight 14 are used together with whatever additional weight or weights are necessary to be used with the weight 16 to balance the beam 11. The net weight of the load is then determined by removing the net contents of the load from the container and placing said contents on the scale. Then by removing from the weight 16 whatever extra weight or weights are necessary to permit the weight 15 to slide along the net beam 12 until the net beam is balanced. The weight 14 is left in the position occupied in determining the gross weight. When the beam 12 is balanced, the net weight may be readily ascertained by adding the amount of weight removed from the weight 16 to the scale number of the net beam 12 opposite which the weight 15 comes to rest.

It is apparent from the construction of the stilyard that movement of the weight 14 directly affects the position of the tare-tape 17. Consequently the tare-tape can be readily ascertained by reading the scale number of the tare-tape 17 opposite which the index or pointer 26 of the weight 16 is, the relative positions of the tare-tape 17 and the index 26 dependent respectively upon the position of the weight 14 in the determination of the gross weight, and the position of the weight 15 in the determination of the net weight.

To illustrate, a load of wheat is to be weighed, the gross weight of which has been determined to be one thousand pounds as shown on the gross beam. The tare-tape has moved to the left while the figure one thousand stands directly over the indicator on the weight 15. The wheat is removed from the container and placed on the scale; and the net contents are determined by sliding the weight 15 from right to left until balance is again attained, the net weight being for example seven hundred pounds. The index of the weight 15 will show three hundred pounds on the tare-tape, the weight 15 will be at rest at the seven hundred mark on the net beam, and the weight 14 will be at rest on the thousand mark of the gross beam.

Having thus described the invention, what is claimed as new is:

1. In a stilyard beam, vertically spaced gross and net beams, a weight slidably engaged with each of said beams, a graduated endless tare-tape extending longitudinally of and between said beams, supporting means for the tare-tape, and said tare-tape being connected with the weight on the gross beam for movement incidental with a shifting of said weight; and the weight on the net beam being provided with an index to be read against the graduation on the tare-tape.

2. In a stilyard or balance beam for scales, a graduated gross beam, blocks depending from said beam at opposite ends thereof, a graduated net beam supported by said blocks, a slide weight associated with each of said beams, spools rotatably mounted on said blocks, a graduated endless tare-tape trained over the spools and having one run thereof connected with the weight on the gross beam, and an index on the weight associated with the net beam and adapted to be read against the graduation on the tare-tape.

3. In a stilyard or balance beam for scales, a graduated gross beam, blocks depending from said beam at opposite ends thereof, a graduated net beam supported by said blocks, a slide weight associated with each of said beams, spools rotatably mounted on said blocks, a graduated endless tare-tape trained over the spools and having one run thereof connected with the weight on the gross beam, and an index on the weight associated with the net beam and adapted to be read against the graduation on the tare-tape, and spring pressed means supporting one of said spools from its block in a manner to urge said spool away from the other of the spool to maintain a tension on the tare-tape.

4. In a stilyard for balance beams for scales, a graduated gross beam, blocks depending from said beam at opposite ends thereof, a graduated net beam supported by said blocks, spools rotatably mounted on said blocks, a graduated endless tare-tape trained over the spools, a weight slidably mounted on the gross beam and having the lower end thereof connected to one run of the tare-tape to permit simultaneous movement of the weight and the tare-tape, a second weight slidably mounted on the net beam and adapted to be moved independently of the tare-tape, and an index on the last mentioned weight, said index being adapted to be read against the graduation of the tare-tape.

HERBERT A. NICHOLS.